(12) United States Patent
Ozonat et al.

(10) Patent No.: US 9,355,166 B2
(45) Date of Patent: May 31, 2016

(54) CLUSTERING SIGNIFIERS IN A SEMANTICS GRAPH

(71) Applicant: Hewlett-Packard Development Company, L.P., Houston, TX (US)

(72) Inventors: Mehmet Kivanc Ozonat, San Jose, CA (US); Claudio Bartolini, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 523 days.

(21) Appl. No.: 13/756,221

(22) Filed: Jan. 31, 2013

(65) Prior Publication Data
US 2014/0214834 A1    Jul. 31, 2014

(51) Int. Cl.
*G06F 17/30* (2006.01)

(52) U.S. Cl.
CPC .... *G06F 17/30598* (2013.01); *G06F 17/30958* (2013.01)

(58) Field of Classification Search
CPC ................................................ G06F 17/30598
USPC ......................................................... 707/737
See application file for complete search history.

(56) References Cited

U.S. PATENT DOCUMENTS

| | | | |
|---|---|---|---|
| 6,947,923 B2 | 9/2005 | Cha et al. | |
| 6,950,827 B2 | 9/2005 | Jung | |
| 7,072,883 B2 | 7/2006 | Potok et al. | |
| 7,103,580 B1 | 9/2006 | Batachia et al. | |
| 7,296,001 B1 | 11/2007 | Ephrati et al. | |
| 7,433,841 B2 | 10/2008 | Byde et al. | |
| 7,562,002 B2 | 7/2009 | Rzevski et al. | |
| 7,693,683 B2 | 4/2010 | Ihara | |
| 7,823,055 B2 | 10/2010 | Sull et al. | |
| 8,103,614 B2 | 1/2012 | Tseng et al. | |
| 8,538,916 B1 * | 9/2013 | Alfonseca et al. | 707/603 |
| 9,002,701 B2 * | 4/2015 | Kandekar et al. | 704/9 |
| 2004/0220944 A1 * | 11/2004 | Behrens et al. | 707/100 |
| 2006/0074980 A1 | 4/2006 | Sarkar | |
| 2008/0133479 A1 * | 6/2008 | Zelevinsky et al. | 707/3 |
| 2009/0313173 A1 | 12/2009 | Singh et al. | |
| 2010/0198841 A1 | 8/2010 | Parker et al. | |
| 2011/0238408 A1 * | 9/2011 | Larcheveque et al. | 704/9 |
| 2011/0238410 A1 * | 9/2011 | Larcheveque et al. | 704/9 |
| 2012/0078612 A1 | 3/2012 | Kandekar et al. | |
| 2013/0097320 A1 * | 4/2013 | Ritter et al. | 709/226 |
| 2013/0138696 A1 * | 5/2013 | Turdakov et al. | 707/794 |
| 2013/0198198 A1 * | 8/2013 | Tsuchimoto | 707/741 |

(Continued)

OTHER PUBLICATIONS

Cao, Mukun., "Multi-strategy Selection Supported Automated Negotiation System Based on BDI Agent," 2012 45th Hawaii International Conference on System Sciences, Jan. 4-7, 2012, pp. 638-647.

(Continued)

*Primary Examiner* — Joshua Bullock
(74) *Attorney, Agent, or Firm* — Brooks, Cameron & Huebsch, PLLC

(57) ABSTRACT

Clustering signifiers in a semantics graph can comprise coarsening a semantics graph associated with an enterprise communication network containing a plurality of nodes into a number of sub-graphs containing supernodes; partitioning each of the number of sub-graphs into a number of clusters; and iteratively refining the number of clusters to reduce an edge-cut of the semantics graph, based on the number of clusters.

20 Claims, 5 Drawing Sheets

(56) References Cited

U.S. PATENT DOCUMENTS

| | | | |
|---|---|---|---|
| 2013/0250802 A1* | 9/2013 | Yalagandula et al. | 370/254 |
| 2014/0094710 A1* | 4/2014 | Sarma et al. | 600/544 |
| 2014/0214690 A1* | 7/2014 | Ozonat | 705/80 |

OTHER PUBLICATIONS

Hasan, et al., "Approximate Semantic Matching of Heterogeneous Events," The 6th ACM International Conference on Distributed Event-Based Systems, Jul. 16-20, 2012, Berlin, Germany, 12 pages.

Krapac, et al., "Learning Tree-structured Descriptor Quantizers for Image Categorization," Retrieved from http://hal.inria.fr/docs/00/61/31/18/PDF/paper.pdf, Aug. 2011, 11 pages.

Menczer, Filippo., "Combining Link and Content Analysis to .Estimate Semantic Similarity," The 13th International World Wide Web Conference, May 17-22, 2004, New York, NY, 2 pages.

Caro, et al., "Using tagFlake for Condensing Navigable Tag Hierarchies from Tag Clouds," The 14th ACM SIGKDD International Conference on Knowledge Discovery and Data Mining, Aug. 24-27, 2008, Las Vegas, NV, USA, pp. 1069-1072.

Begelman, et al., "Automated Tag Clustering: Improving search and exploration in the tag space," Retrieved from http://tagging.pui.ch/automated_tag_clustering/, May 2006, 11 pages.

Russell, et al., "A grammar-based distance metric enables fast and accurate clustering of large sets of 16s sequences," BMC Bioinformatics 2010, Retrieved from http://digitalcommons.unl.edu/cgi/viewcontent.cgi?article=1189&context=electricalengineeringfacpub, Dec. 17, 2010, 14 pages.

Faratin, et al., "Negotiation Decision Functions for Autonomous Agents," Department of Electronic Engineering, Queen Mary and Westfield College, University of London, London, UK, Oct. 22, 1997, 38 pages.

Fatima, et al., "Multi-Issue Negotiation Under Time Constraints," Proceedings of the ACM First International Joint Conference on Autonomous Agents and Multiagent Systems, AAMAS 2002, Jul. 15-19, 2002, Bologna, Italy, 8 pages.

Fatima, et al., "An Agenda Based Framework for Multi-Issue Negotiation," Department of Computer Science, University of Liverpool, Liverpool, UK, Mar. 28, 2003, 50 pages.

Coehoorn, et al., "Learning an Opponent's Preferences to Make Effective Multi-Issue Negotiation Trade-Offs," Proceedings of the 6th International Conference on Electronic Commerce, Delft, The Netherlands, Oct. 25-27, 2004, 10 pages.

Ito, et al., "Multi-Issue Negotiation Protocol for Agents: Exploring nonlinear utility spaces," Proceedings of the 20th International Joint Conference on Artificial Intelligence, Jan. 6-12, 2007, Hyderabad, India, 6 pages.

Van Kleef, et al., "The Interpersonal Effects of Anger and Happiness in Negotiations," Journal of Personality and Social Psychology, vol. 86, No. 1, Jan. 2004, pp. 57-76.

Van Kleef, et al., "The Interpersonal Effects of Emotions in Negotiations: A Motivated Information Processing Approach", Feb. 13, 2003, 30 pages.

Vetschera, Rudolf., "Preference structures and negotiator behavior in electronic negotiations", Decision Support Systems, vol. 44, Mar. 28, 2007, pp. 135-146.

Yukl., Gary A., "Effects of Situational Variables and Opponent Concessions on a Bargainer's Perception, Aspirations, and Concessions", Journal of Personality and Social Psychology, vol. 29, No. 2, May 1974, pp. 227-236.

* cited by examiner

CLUSTERING SIGNIFIERS IN A SEMANTICS GRAPH

BACKGROUND

Enterprises can move workloads from a centrally hosted and managed center to network systems by offering users (e.g., employees or customers) services over the network. A service, as used herein, can include an intangible commodity offer to users of a network. Such services can include computing resources (e.g., storage, memory, processing resources) and/or computer-readable instructions (e.g., programs).

DETAILED DESCRIPTION

Figure 1:
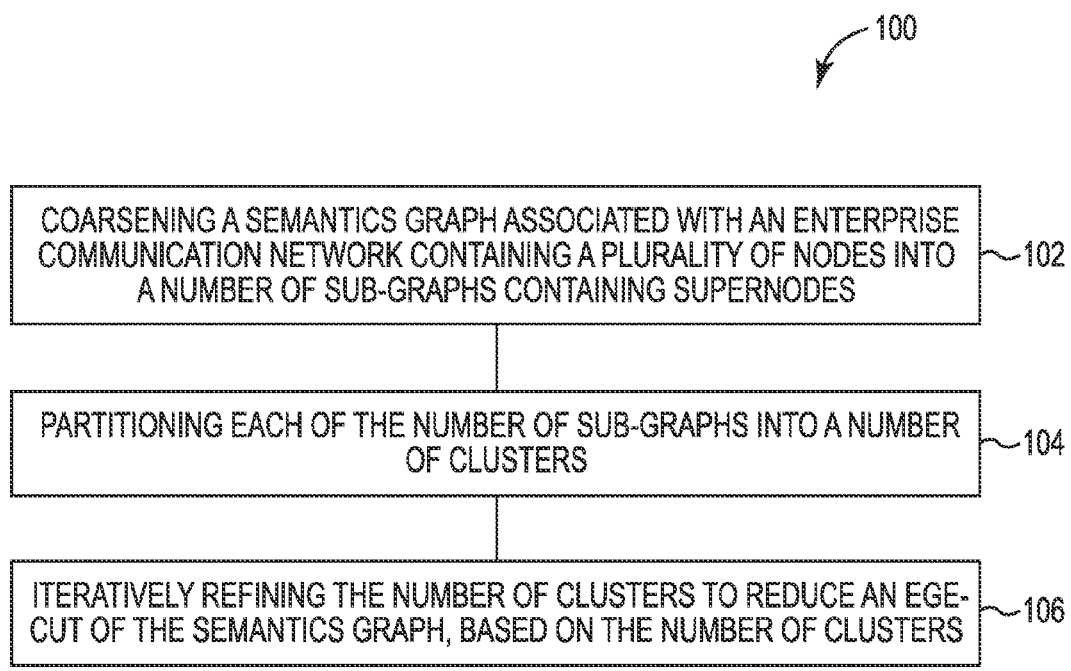
FIG. 1 is a flow chart illustrating an example of a method for clustering signifiers in a semantics graph according to the present disclosure.

An enterprise may use an enterprise network, such as a cloud system and/or Internet network, to distribute workloads. An enterprise network, as used herein, can include a network system to offer services to users of the enterprise (e.g., employees and/or customers). A user may benefit from another user's experience with a particular service. However, due to the distributed nature of an enterprise network, users may have difficulty in sharing knowledge, such as services experiences.

In some situations, an enterprise may use an enterprise communication network to assist users of an enterprise network in sharing knowledge, learning from other users' services experiences, and searching for content relevant to the enterprise and/or the enterprise network. The enterprise communication network, as used herein, can include an electronic communication network to connect users of the network to relevant content. Users of the enterprise communication network can contribute to the enterprise communication network through a range of activities such as posting service-related entries, linking entries to content available on internal and external domains, reading comments, commenting on comments, and/or voting on users' entries. Thereby, the enterprise communication network can act as a social network associated with the enterprise, services offered by the enterprise, and/or documents associated with the enterprise, among other topics.

However, the range of activities that users can contribute to an enterprise communication network can result in the enterprise communication network containing unstructured content. Due to the unstructured nature of the content, a general purpose search engine may not properly function to allow users to search for content in the enterprise communication network. General purpose search engines may utilize measures such as back-links and/or clicks to define a quality and reputation of searched content. In an enterprise communication network, the quality and reputations of content may not be proportional to the number of back-links and/or clicks.

In contrast, in examples of the present disclosure, a relatedness of content within the enterprise communication network can be identified by clustering signifiers in a semantics graph. A semantics graph can be associated with the enterprise communication network in that the semantics graph can include signifiers gathered from content within the enterprise communication network. The signifiers can be identified by gathering content using a search tool and extracting signifiers from the gathered content. A relatedness of the identified signifiers can be defined by clustering signifiers in the semantics graph and can assist users in searching for content within the enterprise communication network.

Examples of the present disclosure may include methods, systems, and computer-readable and executable instructions and/or logic. An example method for clustering signifiers in a semantics graph can include coarsening a semantics graph associated with an enterprise communication network containing a plurality of nodes into a number of sub-graphs containing supernodes, partitioning each of the number of sub-graphs into a number of clusters, and iteratively refining the number of clusters to reduce the edge-cut of the weighted semantics graph, based on the number of clusters.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and the process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. Elements shown in the various examples herein can be added, exchanged, and/or eliminated so as to provide a number of additional examples of the present disclosure.

In addition, the proportion and the relative scale of the elements provided in the figures are intended to illustrate the examples of the present disclosure, and should not be taken in a limiting sense. As used herein, "a number of" an element and/or feature can refer to one or more of such elements and/or features.

FIG. 1 is a flow chart illustrating an example of a method 100 for clustering signifiers in a semantics graph according to the present disclosure. The method 100 can be used to cluster signifiers in a semantics graph associated with an enterprise communication network containing a plurality of signifiers. An enterprise communication network, as used herein, can include a network connecting a plurality of users and content through a range of activities. The activities can be related to a services network of the enterprise (e.g., enterprise network). For example, the activities can include posting service-related entries, linking entries to internal enterprise domains and/or external domains, and/or reading, commenting, and/or voting on other user's entries. In various examples of the present disclosure, the enterprise communication network can be a sub-portion of and/or contained within the enterprise network.

A semantics graph can allow users of the enterprise communication network to search for content within the enterprise communication network. A general purpose search engine may not be able to search for content in the enterprise communication network given the unstructured nature of the content. Such a search engine may function by defining a quality and reputation of content (e.g., domains) based on a number of back-links (e.g., links from other content) and/or clicks by a user. However, content in the enterprise communication network may not have proportional back-links and/or clicks to the quality and/or reputation of the content. In some instances, content in the enterprise communication network may not have measureable back-links and/or clicks (e.g., email). In order to search content within the enterprise communication network, semantics of signifiers within the enterprise network can be clustered.

A semantics graph, as used here, can include a data structure representing concepts that are related to one another. The concepts can include words, phrases, and/or acronyms for instance. The semantics graph can include a plurality of nodes connected by a plurality of edges. A node can include a vertex representing a signifier. An edge can be incident to a vertex (e.g., an edge can connect a first vertex to a second vertex). A signifier, as used herein, can include a word, phrase, and/or acronym within the content of the enterprise network and/or the enterprise communication network. The signifiers can be gathered, in various examples, using search tools (e.g., web crawlers) and extraction tools (e.g., extractors). A signifier associated with the enterprise communication network can include a signifier gathered from the enterprise network and/or the enterprise communication network.

The semantics graph can be represented by the following:

$$G=(S,E).$$

wherein S can denote a number of nodes (e.g. signifiers), and E can denote a number of edges (e can denote each individual edge) such that each of the number of edges e connects the nodes in S. In other words, the G=(S,E) graph can be said to have a vertex set S and an edge set E.

As used herein, a semantics graph can include a weighted semantics graph. A weighted semantics graph can include edges weighted to denote a numerical value associated with the edge. For instance, an edge connecting a pair of related signifiers (e.g., a first signifier and a second signifier) can be weighted with a positive numerical value representing a distance metric between the pair of related signifiers. As discussed further herein, a vertex weight can be calculated for the weighted graph. A vertex weight can include a numerical value associated with a node. A weighted semantics graph can be represented by the following:

$$G=(S,E,w).$$

At 102, the method 100 for clustering signifiers in a semantics graph can include coarsening the semantics graph for the enterprise communication network containing a plurality of nodes into a number of sub-graphs containing supernodes. A supernode, as used herein, can include a number of nodes and the incident edges associated with each of the number of nodes. An edge incident to a first node can include an edge that connects the first node to a second node.

A semantics graph can include a number of subsets of nodes. A subset of nodes can include nodes that are related to one another by semantic proximity. Semantic proximity, as used herein, can include semantic relatedness and/or semantic similarity wherein a metric is assigned to a pair of signifiers indicating their relatedness. For instance, semantic proximity and/or semantic relatedness can indicate how frequently a pair of signifiers is used together. Coarsening the semantics graph can include condensing the subset of nodes into a number of supernodes such that the number of incident edges belonging to different subsets of nodes (e.g. the edge-cut) is minimized. For example, a subset of nodes can include four nodes representing the words "a", "the", "wireless" and "connection", and the edges connecting the four nodes. A supernode can be created (e.g., supernode X) representing the words "a", "the", and "wireless", connected to the node "connection". In this example, the edge-cut can be reduced from 3 to 1 given that supernode X is only connected to one other node.

In a number of examples, a sub-graph can be iteratively coarsened to further reduce the edge-cut. In other words, coarsening the semantics graph can include condensing the semantics graph into a number of supernodes a number of times, until no two edges in each sub-graph are incident to the same node and/or supernode.

For example, a semantics graph (e.g., $G_0$ wherein '0' can denote that the graph has not been coarsened) can be iteratively coarsened into a number of sub-graphs (e.g., $G_1, G_2, \ldots, G_m$) such that the number of nodes and/or supernodes in each sub-graph $G_1, G_2, \ldots, G_m$ decreases during each coarsening iteration (e.g., $S_0 > S_1 > S_2 > \ldots > S_m$).

At 104, the method 100 for clustering signifiers in a semantics graph can include partitioning each of the number of sub-graphs into a number of clusters. In a number of examples, each of the number of sub-graphs can be partitioned into a number of clusters using a vertex weight for the sub-graph. The vertex weight for the sub-graph can include the sum of the weights of the vertices in the sub-graph. In a number of examples, if a vertex is not assigned a weight, the vertex can be assigned a weight of 1. The sub-graph can then be partitioned into two clusters, wherein each cluster has a vertex weight equal to one half of the vertex weight for the sub-graph.

In a number of examples, each of the number of sub-graphs can be iteratively partitioned into a number of clusters using a vertex weight. For instance, a sub-graph can include a vertex weight of 500 and can be partitioned into two clusters each with a vertex weight of 250, and further partitioned into four clusters each with a vertex weight of 125. In other words, each of the number of sub-graphs $G_1, G_2, \ldots, G_m$ can be partitioned into a number of clusters, wherein each cluster is an equal portion the sub-graph. In a number of examples, the number of sub-graphs can be partitioned into a number of distinct clusters by using an algorithm (e.g. the Kernighan-Lin algorithm).

At 106, the method 100 for clustering signifiers in a semantics graph can include iteratively refining the number of clusters to reduce an edge-cut of the semantics graph, based on the number of clusters. Refining the semantics graph can include further reducing the edge-cut of the semantics graph using local refinement heuristics. For instance, after each of the number of sub-graphs are partitioned into a number of clusters, the edge-cut of the semantics graph can be determined. To further reduce the edge-cut of the number of clusters in the semantics graph, a first node and/or supernode from a first cluster can be switched with a second node and/or supernode from a second cluster. If the edge-cut of the number of clusters after the switch is more than the edge-cut of the number of clusters before the switch, the switch can be reversed. Conversely, if the edge-cut of the number of clusters after the switch is less than the edge-cut of the number of clusters before the switch, the switch can be maintained. This process can be iteratively repeated until the edge-cut of the number of clusters cannot be further reduced.

Figure 2A:
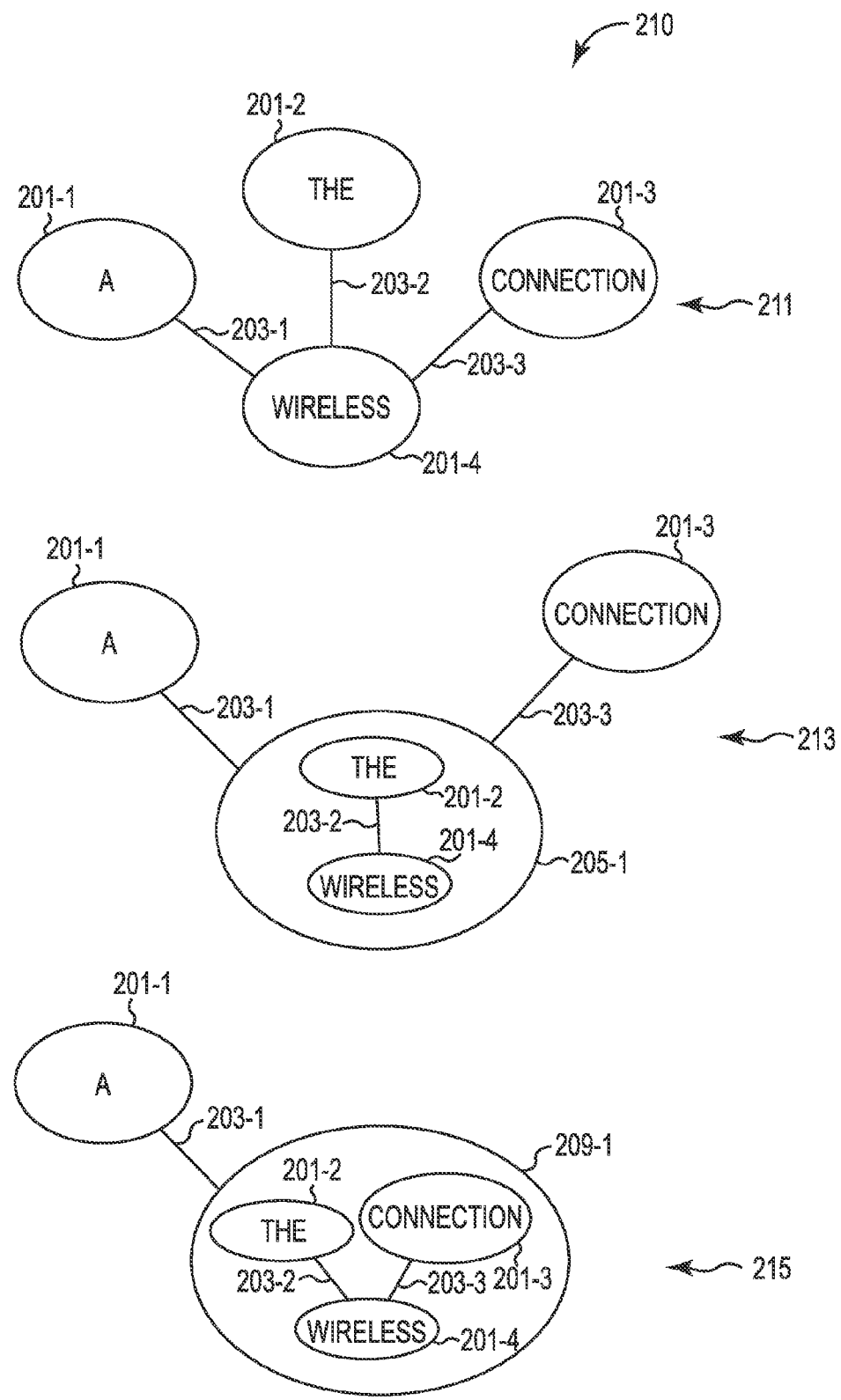
FIG. 2A illustrates an example of a coarsening process for clustering signifiers in a semantics graph according to the present disclosure.

FIG. 2A illustrates an example of a coarsening process 210 for clustering signifiers in a semantics graph according to the present disclosure. A coarsening process 210 for clustering signifiers can include coarsening a subset of nodes in a semantics graph. As shown at 211, a subset of nodes can include the nodes "a" 201-1, "the" 201-2, "connection" 201-3, and "wireless" 201-4 connected by edges 203-1, 203-2, and 203-3. Edges 203-1, 203-2, and 203-3 can be weighted with a numerical value, for instance, representing a distance metric and/or a co-occurrence metric. In a number of examples, nodes 201-1, 201-2, and/or 201-3 can be weighted with a numerical value.

As shown at 213, a first sub-graph containing supernode 205-1 can be created by condensing nodes 201-1 and 201-2 during a first coarsening iteration. A supernode can include a number of nodes and the edges connecting the number of nodes. For instance, supernode 205-1 can include nodes 201-2 and 201-4, as well as edge 203-2.

As shown at 215, a second sub-graph containing supernode 209-1 can be created by condensing supernode 205-1 with node 201-3 during a second coarsening iteration, such that the number of incident edges is reduced to 1. For instance, supernode 209-1 can include nodes 201-2, 209-1 and 201-4, as well as edges 203-2 and 203-3, and can be connected to node 201-1 by edge 203-1.

Each coarsening iteration of the semantics graph can include a matching of nodes within the semantics graph. A matching of nodes within the semantics graph can include forming maximal matchings, wherein a matching is maximal if any edge in the semantics graph that is not in the matching has at least one of its nodes matched. In other words, each coarsening iteration of the semantics graph can include a series of matching iterations to reduce the number of nodes.

For instance, a weighted semantics graph can start with 10,000 nodes. After a first coarsening iteration, the weighted semantics graph can include a number of sub-graphs containing a number of supernodes and/or nodes, wherein the total number of supernodes and/or nodes in the weighted semantics graph can be 9,000. After the second coarsening iteration, the weighted semantics graph can include a number of sub-graphs containing a number of supernodes and/or nodes, wherein the total number of supernodes and/or nodes can be 8,200.

Figure 2B:
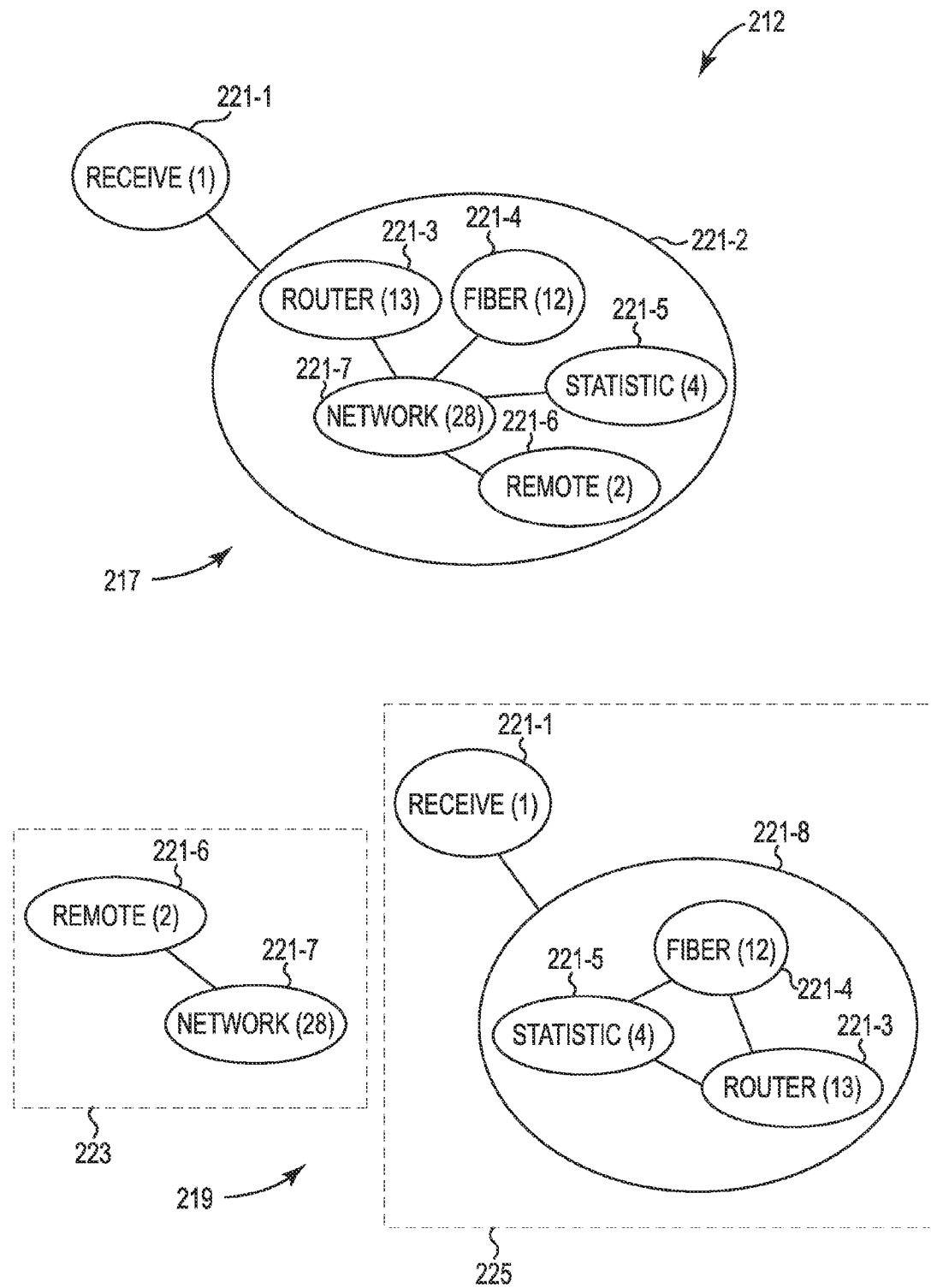
FIG. 2B illustrates an example of a partitioning process for clustering signifiers in a semantics graph according to the present disclosure.

FIG. 2B illustrates an example of a partitioning process 212 for clustering signifiers in a semantics graph according to the present disclosure. The partitioning process 212 can include computing a bisection of the number of sub-graphs. In other words, the partitioning process 212 can include partitioning each of the number of sub-graphs into a number of clusters, wherein each of the number of clusters includes half of the total vertex weight of the sub-graph it was partitioned from.

For instance, as shown in FIG. 2B, sub-graph 217 can include a node "receive" 221-1 that has a vertex weight of 1 (indicated in FIG. 2B by the parenthetical number following the word "receive"), connected to supernode 221-2 which includes the nodes "router" 221-3, "fiber" 221-4, "statistic" 221-5, "remote" 221-6, and "network" 221-7, with vertex weights of 13, 12, 4, 2, and 28, respectively. The partitioning process 212 can include creating a partitioned graph 219 by partitioning sub-graph 217 into two clusters 223 and 225, wherein cluster 223 and cluster 225 each have a vertex weight of 30 (e.g., 28+2, 1+12+4+13) or half of the total vertex weight of 60 of sub-graph 217 (e.g., 1+13+12+28+4+2). That is, cluster 223 can include nodes 221-6 and 221-7, whereas cluster 225 can include nodes 221-1, and supernode 221-8 wherein supernode 221-8 includes nodes 221-5, 221-4, and 221-3. In a number of examples, the partitioning process 212 can include computing a high-quality bisection of the number of sub-graphs using the Kernighan-Lin algorithm.

Figure 2C:
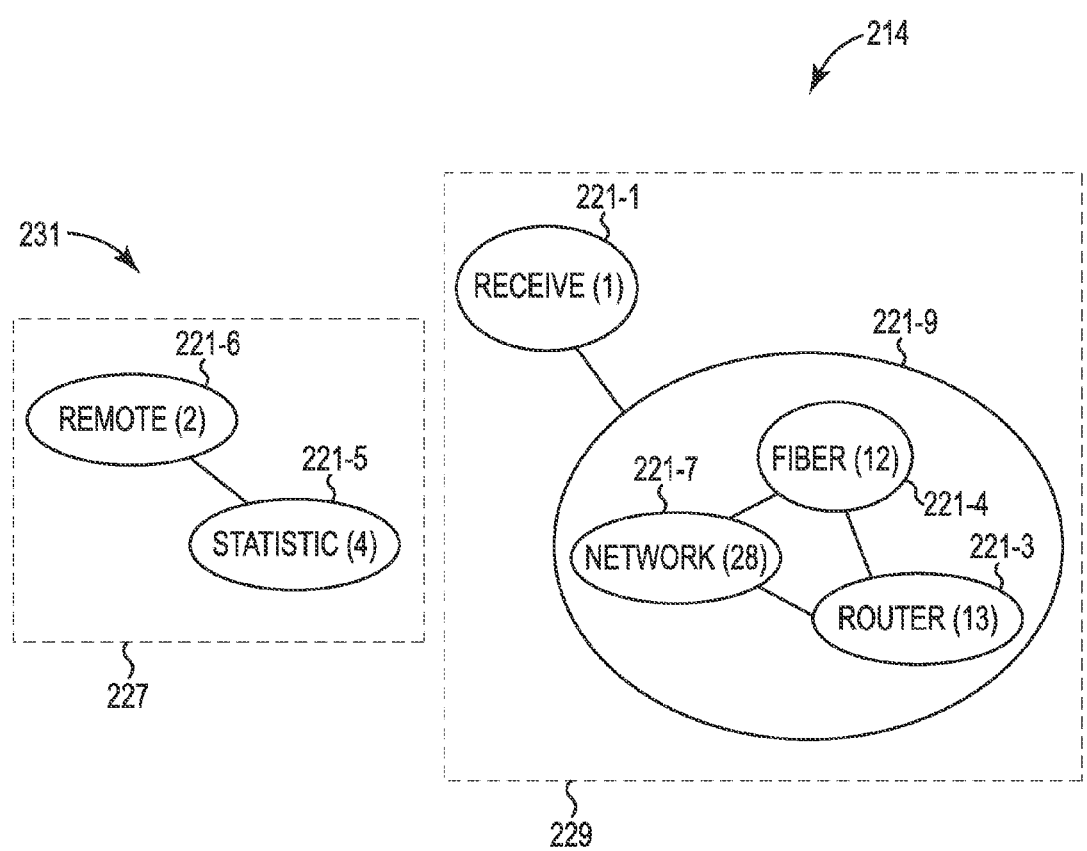
FIG. 2C illustrates an example of a refining process for clustering signifiers in a semantics graph according to the present disclosure.

FIG. 2C illustrates an example of a refining process 214 for clustering signifiers in a semantics graph according to the present disclosure. The refining process 214 can include switching a node or subset of nodes between a pair of clusters to reduce the edge-cut of the partitioned graph 219 (illustrated in FIG. 2B).

For instance, the edge-cut of the partitioned graph 219 can include the numerical value of 5 indicating the number of incident edges belonging to different subsets of nodes (e.g. edge-cut). In contrast, the edge-cut of the refined graph 231 can include the numerical value of 4, indicating a reduced edge-cut. In a number of examples, the refined graph 219 can be iteratively refined by switching a pair of nodes and/or subsets of nodes between clusters 227 and 229 until the edge-cut of the refined graph 231 cannot be reduced any further.

Figure 3:
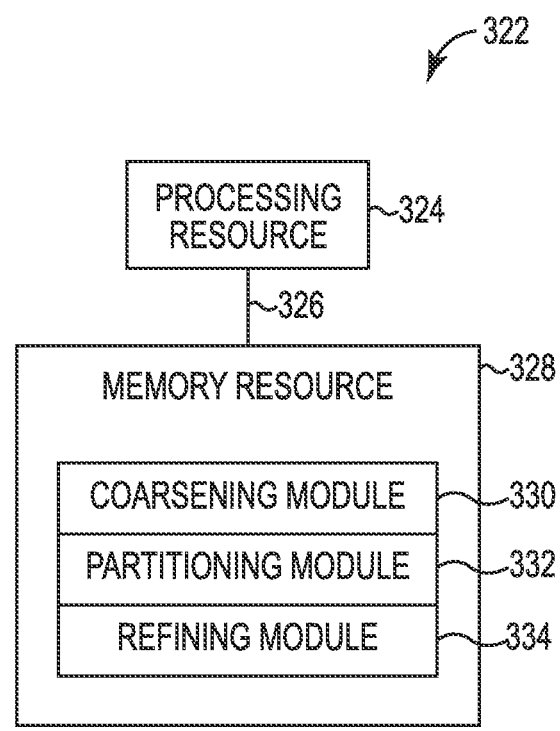
FIG. 3 is a diagram illustrating an example of a system according to the present disclosure.

FIG. 3 illustrates a block diagram of an example of a system 322 according to the present disclosure. The system 322 can utilize software, hardware, firmware, and/or logic to perform a number of functions.

The system 322 can be any combination of hardware and program instructions configured to cluster signifiers in a semantics graph. The hardware, for example, can include a processing resource 324, and/or a memory resource 328 (e.g., computer-readable medium (CRM), machine readable medium (MRM), database, etc.) A processing resource 324, as used herein, can include any number of processors capable of executing instructions stored by a memory resource 328. Processing resource 324 may be integrated in a single device or distributed across devices. The program instructions (e.g., computer-readable instructions (CRI)) can include instructions stored on the memory resource 328 and executable by the processing resource 324 to implement a desired function (e.g., to coarsen a semantics graph associated with an enterprise communication network, etc.).

The memory resource 328 can be in communication with a processing resource 324. A memory resource 328, as used herein, can include any number of memory components capable of storing instructions that can be executed by processing resource 324. Such memory resource 328 can be non-transitory CRM. Memory resource 328 may be integrated in a single device or distributed across devices. Further, memory resource 328 may be fully or partially integrated in the same device as processing resource 324 or it may be separate but accessible to that device and processing resource 324. Thus, it is noted that the system 322 may be implemented on a user and/or a client device, on a server device and/or a collection of server devices, and/or on a combination of the user device and the server device and/or devices.

The processing resource 324 can be in communication with a memory resource 328 storing a set of CRI executable by the processing resource 324, as described herein. The CRI can also be stored in remote memory managed by a server and represent an installation package that can be downloaded, installed, and executed. The system 322 can include memory resource 328, and the processing resource 324 can be coupled to the memory resource 328.

Processing resource 324 can execute CRI that can be stored on an internal or external memory resource 328. The processing resource 324 can execute CRI to perform various functions, including the functions described with respect to FIGS. 1, 2A, 2B, and 2C. For example, the processing resource 324 can execute CRI to cluster signifiers in a semantics graph.

The CRI can include a number of modules 330, 332, 334. The number of modules 330, 332, 334 can include CRI that when executed by the processing resource 324 can perform a number of functions.

The number of modules 330, 332, 334 can be sub-modules of other modules. For example, the coarsening module 330 and the partitioning module 332 can be sub-modules and/or contained within the same computing device. In another example, the number of modules 330, 332, 334 can comprise individual modules at separate and distinct locations (e.g., CRM, etc.).

A coarsening module 330 can include CRI that when executed by the processing resource 324 can provide a number of coarsening functions. The coarsening module 330 can reduce the number of nodes in the semantics graph. The coarsening module can create a number of sub-graphs containing supernodes within the semantics graph by matching and collapsing matched nodes within the semantics graph.

A partitioning module 332 can include CRI that when executed by the processing resource 324 can perform a number of partitioning functions. The partitioning module 332 can divide (e.g. partition) each of the number of sub-graphs created by the coarsening module 330 into a number of clusters.

A refining module 334 can include CRI that when executed by the processing resource 334 can perform a number of refining functions. The refining module 334 can iteratively refine the number of clusters created by the partitioning module 332 to reduce the edge-cut of the semantics graph, based on the number of clusters.

A memory resource 328, as used herein, can include volatile and/or non-volatile memory. Volatile memory can include memory that depends upon power to store information, such as various types of dynamic random access memory (DRAM), among others. Non-volatile memory can include memory that does not depend upon power to store information.

The memory resource 328 can be integral, or communicatively coupled, to a computing device, in a wired and/or a wireless manner. For example, the memory resource 328 can be an internal memory, a portable memory, a portable disk, or a memory associated with another computing resource (e.g., enabling CRIs to be transferred and/or executed across a network such as the Internet).

The memory resource 328 can be in communication with the processing resource 324 via a communication path 326. The communication path 326 can be local or remote to a machine (e.g., a computing device) associated with the processing resource 324. Examples of a local communication path 326 can include an electronic bus internal to a machine (e.g., a computing device) where the memory resource 328 is one of volatile, non-volatile, fixed, and/or removable storage medium in communication with the processing resource 324 via the electronic bus.

The communication path 326 can be such that the memory resource 328 is remote from the processing resource (e.g., 324), such as in a network connection between the memory resource 328 and the processing resource (e.g., 324). That is, the communication path 326 can be a network connection. Examples of such a network connection can include a local area network (LAN), wide area network (WAN), personal area network (PAN), and the Internet, among others. In such examples, the memory resource 328 can be associated with a first computing device and the processing resource 324 can be associated with a second computing device (e.g., a Java® server). For example, a processing resource 324 can be in communication with a memory resource 328, wherein the memory resource 328 includes a set of instructions and wherein the processing resource 324 is designed to carry out the set of instructions.

The processing resource 324 coupled to the memory resource 328 can execute CRI to cluster signifiers in a semantics graph. The processing resource 324 coupled to the memory resource 328 can also execute CRI to create a coarsened graph by iteratively matching a number of nodes within a subset of nodes in a semantics graph, and collapsing each set of matched nodes to create a supernode; create a partitioned graph from the coarsened graph by partitioning a number of sub-graphs in the coarsened graph based on a vertex weight, wherein the partitioned graph includes a reduced edge-cut as compared to the semantics graph; and reduce the edge-cut of the partitioned graph using local refinement heuristics.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method comprising:
    generating a semantics graph that represents content extracted from an enterprise network in the form of signifiers, wherein nodes of the semantics graph represent the signifiers;
    coarsening the semantics graph of the signifiers into a number of sub-graphs, the number of sub-graphs including a particular sub-graph that comprises a first node and a second node of the semantics graph;
    after coarsening the semantics graph into the number of sub-graphs, splitting the particular sub-graph into multiple clusters comprising a first cluster that includes the first node and a second cluster that includes the second node; and
    after splitting the particular sub-graph into the multiple clusters, reducing an edge-cut of the multiple clusters by switching the first node from the first cluster to the second cluster and switching the second node from the second cluster to the first cluster.

2. The method of claim 1, wherein coarsening the semantics graph comprises condensing multiple individual nodes of the semantics graph into a supernode, the supernode including the multiple individual nodes and incident edges of the multiple individual nodes.

3. The method of claim 2, wherein prior to splitting the particular sub-graph, the particular sub-graph includes the supernode.

4. The method of claim 3, wherein splitting the particular sub-graph into the multiple clusters comprises:
    splitting the supernode so that some of the multiple individual nodes of the supernode are included in the first cluster and others of the multiple individual nodes of the supernode are included in the second cluster.

5. The method of claim 1, wherein the semantics graph comprises a weighted semantics graph; and wherein splitting the particular sub-graph comprises splitting the particular sub-graph into the multiple clusters based on weights of the nodes included in the particular sub-graph.

6. The method of claim 5, wherein splitting the particular sub-graph into multiple clusters based on the weights of the nodes comprises splitting the particular sub-graph so that the first cluster and the second cluster have equal node weights.

7. The method of claim 1, wherein reducing comprises iteratively reducing the edge-cut using local refinement heuristics.

8. A non-transitory computer-readable medium storing instructions executable by a processing resource to:
generate a weighted semantics graph that represents content extracted from an enterprise network in the form of signifiers, wherein nodes of the weighted semantics graph represent the signifiers;
coarsen the weighted semantics graph into a number of sub-graphs, including a particular sub-graph comprising a supernode comprising multiple individual nodes of the semantics graph;
after coarsening of the semantics graph, split the particular sub-graph into a first cluster and a second cluster of equal weight; and
after splitting the particular sub-graph into the first and second clusters, reduce an edge-cut of the first and second clusters by switching an individual node in the first cluster with another individual node in the second cluster.

9. The non-transitory computer-readable medium of claim 8, wherein the instructions are executable by the processing resource to split the particular sub-graph into the first and second clusters by assigning the supernode to the first cluster.

10. The non-transitory computer-readable medium of claim 8, wherein the instructions are executable by the processing resource to split the particular sub-graph into the first and second clusters by assigning some of the multiple individual nodes of the supernode to the first cluster and assigning others of the multiple individual nodes of the supernode to the second cluster.

11. The non-transitory computer-readable medium of claim 8, wherein the instructions are executable by the processing resource to coarsen the weighted semantics graph into the number of sub-graphs in multiple iterations.

12. The non-transitory computer-readable medium of claim 11, wherein the instructions are executable by the processing resource to coarsen the weighted semantics graphs by:
in a first iteration of the multiple iterations:
condense a first individual node and a second individual nodes of the semantics graph into a first supernode; and
in a second iteration of the multiple iterations:
condense the first supernode and a third individual node of the semantics graph to form the supernode comprising the multiple individual nodes of the weighted semantics graph.

13. The non-transitory computer-readable medium of claim 11, wherein a number individual nodes in the semantics graph is reduced with each of the multiple iterations as individual nodes are condensed into supernodes.

14. A system comprising:
a processing resource; and
a memory resource coupled to the processing resource, the memory resource comprising instructions executable by the processing resource to:
generate a semantics graph that represents content extracted from an enterprise network in the form of signifiers, wherein nodes of the semantics graph represent the signifiers;
create a coarsened graph from a semantics graph, the coarsened graph comprising multiple sub-graphs, the multiple sub-graphs comprising a particular sub-graph including a first node and a second node of the semantics graph;
create a partitioned graph from the coarsened graph by splitting each of the multiple sub-graphs into multiple clusters, including splitting the particular sub-graph itself into multiple clusters comprising a first cluster including the first node and a second cluster including the second node; and
reduce an edge-cut of the partitioned graph using local refinement heuristics.

15. The system of claim 14, wherein the instructions are executable by the processing resource to reduce the edge-cut of the partitioned graph using local refinement heuristics by determining the edge-cut of the partitioned graph after switching the first node in the first cluster with the second node in the second cluster.

16. The system of claim 15, wherein the instructions executable by the processing resource to reduce the edge-cut of the partitioned graph using local refinement heuristics further by maintaining the switched first node and second node when the switch reduces the edge-cut of the partitioned graph.

17. The system of claim 15, wherein the instructions executable by the processing resource to reduce the edge-cut of the partitioned graph using local refinement heuristics further by reversing the switched of the first node and the second node when the switch does not reduce the edge-cut of the partitioned graph.

18. The system of claim 14, wherein the semantics graph comprises a weighted semantics graph; and
wherein the instructions are executable by the processing resource to create the partitioned graph from the coarsened graph by splitting the particular sub-graph itself into multiple clusters of equal weight.

19. The system of claim 14, wherein the instructions are executable by the processing resource to create the coarsened graph to include a supernode comprising multiple individual nodes of the semantics graph.

20. The system of claim 19, wherein the instructions are executable by the processing resource further to generate the supernode by condensing the multiple individual nodes into the supernode over multiple coarsening iterations.

* * * * *